UNITED STATES PATENT OFFICE.

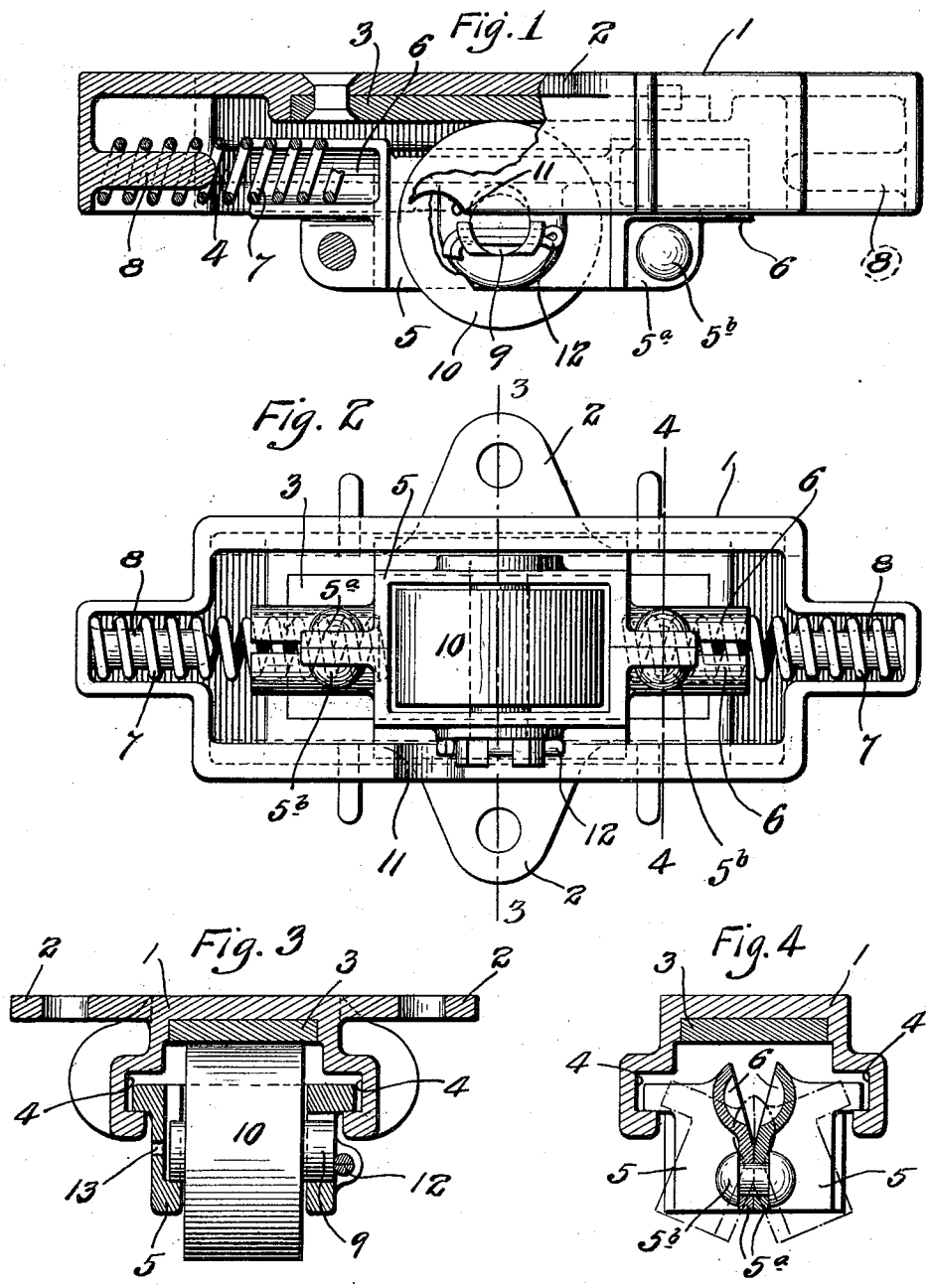

EDWIN G. BUSSE AND ERNEST A. LE BEAU, OF CHICAGO, ILLINOIS, ASSIGNORS TO CHICAGO RAILWAY EQUIPMENT COMPANY, OF CHICAGO, ILLINOIS, A CORPORATION OF ILLINOIS.

ROLLER SIDE BEARING FOR RAILWAY-CARS.

1,142,398.  Specification of Letters Patent.  Patented June 8, 1915.

Application filed May 16, 1914. Serial No. 839,016.

*To all whom it may concern:*

Be it known that we, EDWIN G. BUSSE and ERNEST A. LE BEAU, citizens of the United States, residing at Chicago, Illinois, have invented a certain new and useful Improvement in Roller Side Bearings for Railway-Cars, of which the following is a full, clear, and exact description, such as will enable others skilled in the art to which it appertains to make and use the same, reference being had to the accompanying drawings, forming part of this specification, in which—

Figure 1 is a side elevational view partly in section of our improved roller side bearing for railway cars. Fig. 2 is a bottom plan view. Fig. 3 is a vertical cross sectional view on line 3—3 of Fig. 2, and Fig. 4 is a vertical cross sectional view on line 4—4 of Fig. 2.

This invention relates to a new and useful improvement in roller side bearings for railway cars of the single roller type having centering means, preferably in the form of springs, whose energies are normally exerted to center said roller.

While we have shown an inverted bearing designed especially to be attached to the body bolster of the car, it is obvious that this bearing could be used on the truck bolster, in which event, the roller would be presented upwardly and dirt exits provided at each end of the main casting preferably in line with the surface of the track plate.

In the drawings 1 indicates a casting having attaching lugs or ears 2 extending from its base portion. The track plate 3, preferably of hardened steel, is secured to the inner side of the base portion. The side walls of the casting are formed with inwardly presented grooves 4 in which are slidingly arranged bearing blocks 5 and having spring housings 6 extending upwardly from their ends in which are seated springs 7, said springs coöperating with teats 8 arranged in the housings formed in the end walls of the main casting.

9 is an axle whose ends are mounted in the bearing blocks 5 and 10 is the roller mounted on the axle between the bearing blocks and coöperating with the track plate 3. The periphery of this roller extends beyond the plane of the edges of the bearing blocks. One of the side walls is provided with a recess 11 in such shape as to permit the insertion and removal of the axle in assembling and dismantling the bearing.

It will be observed that each of the bearing blocks is provided with contiguous lugs or ears $5^a$ through which are passed securing rivets or bolts $5^b$ which hold the bearing blocks in their operative position. The upper inner face of each bearing block is cut away or inclined as shown in Fig. 4 so that when the fastening devices $5^b$ are removed, the bearing blocks can be tilted, as shown in dotted lines, and in that way removed from the housing. However, if it is desired not to renew the bearing blocks, but only to renew the roller, the roller carriage formed by the bearing blocks can be slightly displaced, to one side, so as to aline the axle to the recess 11.

A cotter pin 12 holds the axle in position and when the axle is alined with the recess 11 an instrument may be inserted through the opening 13 in the wall of one of the bearing blocks so as to force the axle out of the recess 11 whereby the roller may be removed. Of course the reverse operation would occur in mantling the device.

As shown, the bearing apertures for the axle 9 may be somewhat elongated vertically to permit of a slight vertical movement of the roller independently of the carriage, as well as a free spinning movement of the roller.

Although in the form shown, but one roller is employed, it is obvious that the carriage may be constructed so as to carry two or more rollers arranged to track one another.

It is obvious further, that other changes and modifications may be made without departing from the spirit and scope of the invention.

We claim:—

1. A side bearing for railway cars comprising a casing having vertically disposed side walls, a carriage sustained for movement between said walls, and longitudinally of the casing, a removable axle having bearing at its ends in said carriage, a roller mounted on said axle, the carriage being provided in one wall with an opening through which the axle is moved longitudinally to and from position and the adjacent wall of the casing having a recess disposed within the plane of the line of movement of the carriage and to register with said opening, the opening and recess being in non-alinement when the carriage is in normally centered position, and springs for centering said carriage.

2. A side bearing for railway cars comprising a housing and a two-part carriage mounted to slide in said housing, said carriage comprising two substantially duplicate parts whose inner bearing faces are cut away to permit the parts of the carriage to be collapsed for purposes of insertion and removal, and means for securing the parts of the carriage together in their operative position.

3. A side bearing for railway cars comprising a housing having longitudinal guide ways, a two part carriage mounted to slide in said housing and provided with flanges to seat within the guide ways, said carriage comprising two substantially duplicate parts whose inner bearing faces are oppositely cut away at an angle to permit the parts of the carriage to be collapsed for engaging or disengaging the flanges with the guide ways, and means for securing the parts of the carriage together in their operative position.

In testimony whereof we hereunto affix our signatures in the presence of two witnesses, this 12th day of May, 1914.

EDWIN G. BUSSE.
ERNEST A. LE BEAU.

Witnesses:
E. T. WALKER,
M. F. HUNTOON.

Copies of this patent may be obtained for five cents each, by addressing the "Commissioner of Patents, Washington, D. C."